United States Patent
Chang et al.

(10) Patent No.: US 7,941,461 B2
(45) Date of Patent: May 10, 2011

(54) SYSTEM AND METHOD FOR DEVELOPING AND ENABLING MODEL-DRIVEN XML TRANSFORMATION FRAMEWORK FOR E-BUSINESS

(75) Inventors: Hung-yang Chang, Scarsdale, NY (US); Shyh-Kwei Chen, Chappaqua, NY (US); Hui Lei, Scarsdale, NY (US)

(73) Assignee: International Business Machines Corporation, Armonk, NY (US)

( * ) Notice: Subject to any disclaimer, the term of this patent is extended or adjusted under 35 U.S.C. 154(b) by 375 days.

(21) Appl. No.: 12/061,034

(22) Filed: Apr. 2, 2008

(65) Prior Publication Data
US 2008/0189323 A1    Aug. 7, 2008

Related U.S. Application Data

(63) Continuation of application No. 11/337,025, filed on Jan. 23, 2006, now abandoned.

(51) Int. Cl.
G06F 7/00 (2006.01)
G06F 17/30 (2006.01)
G06F 13/14 (2006.01)

(52) U.S. Cl. ......... 707/803; 707/790; 707/802; 707/809

(58) Field of Classification Search ................. 717/104; 715/234–235; 707/803; 1/1
See application file for complete search history.

(56) References Cited

U.S. PATENT DOCUMENTS

| | | | |
|---|---|---|---|
| 2002/0104071 A1 | 8/2002 | Charisius et al. | |
| 2003/0074648 A1 | 4/2003 | Brassard et al. | |
| 2004/0015834 A1 | 1/2004 | Mestre et al. | |
| 2005/0050311 A1 | 3/2005 | Joseph et al. | |
| 2005/0071805 A1 | 3/2005 | Lauterbach et al. | |
| 2005/0091249 A1 | 4/2005 | Hanson et al. | |
| 2006/0064667 A1* | 3/2006 | Freitas | 717/104 |
| 2007/0174763 A1* | 7/2007 | Chang et al. | 715/513 |

FOREIGN PATENT DOCUMENTS
WO    WO2004107162    12/2004

\* cited by examiner

*Primary Examiner* — Cam Y Truong
*Assistant Examiner* — Cecile Vo
(74) *Attorney, Agent, or Firm* — Whitham, Curtis, Christofferson & Cook, P.C.; Stephen C. Kaufman

(57) ABSTRACT

A system and method for developing and enabling model-driven extensible Markup Language (XML) transformation to XML Metadata Interchange (XMI) format incorporate a strong built-in validation capability. A platform independent framework applies multiple passes of transformation, where each pass performs specific operations on internal models. Different source models are then merged into a target model.

4 Claims, 10 Drawing Sheets

```xml
<InformationModel xmi:id="IM-0" ownedMember="IM-1 IM-2 IM-3 IM-4 IM-5 IM-6"/>

<PrimitiveType xmi:id="IM-1" name="primitiveBase" owningPackage="IM-0"/>

<PrimitiveType xmi:id="IM-2" name="number" owningPackage="IM-0" superClassifer="IM-1"/>

<PrimitiveType xmi:id="IM-3" name="integer" owningPackage="IM-0" superClassifer="IM-2"/>

<PrimitiveType xmi:id="IM-4" name="string" owningPackage="IM-0" superClassifer="IM-1"/>

<StructuredDataType xmi:id="IM-5" name="snapShot" owningPackage="IM-0">

<ownedAttribute xmi:id="IM-5-1" name="currentInventory" type="IM-3"/>

<ownedAttribute xmi:id="IM-5-2" name="currentThreshold" type="IM-3"/>

</StructuredDataType>

<DescriptorType xmi:id="IM-6" name="describeMonitoringContextDefinition" owningPackage="IM-0">

<ownedAttribute xmi:id="IM-6-1" name="isAutogenerated" type="IM-4"/>

<ownedAttribute xmi:id="IM-6-2" name="resourceBundleKey" type="IM-3"/>

</DescriptorType>
```

*Figure 2*

```
<ObservationModel xmi:id="OM-0" name="InventoryLevel" ownedMember="OM-1 OM-2"/>
  <EventType xmi:id="OM-1" name="InventoryAlert" owningPackage="OM-0">
    <ownedAttribute xmi:id="OM-1-1" name="itemID" type="IM-4"/>
    <ownedAttribute xmi:id="OM-1-2" name="currentState" type="IM-5"/>
</EventType>

<MonitoringContextDefinition xmi:id="OM-2" name="monitorInventoryLevel" owningPackage= "OM-0">
  <descriptor xmi:id="OM-2-1" name="monitoringContextDefinition_monitorInventoryLevel">
    <slot xmi:id"OM-2-1-1" definingFeature="IM-6-1"><value xsi:type="Boolean" value="false"/></slot>
    <slot xmi:id"OM-2-1-2" definingFeature="IM-6-2"><value xsi:type="Integer" value="1200"/></slot>
</descriptor>

<situationDefinition xmi:id="OM-2-2" name="inventoryTooLow" isRepeatable="false">
  <situationTriggeredEvent xmi:id="OM-2-2-1" name="lowInventory" type="OM-1">
    <mapDefinition xmi:id="OM-2-2-1-1">
        ... Verbose Parsed Expression Tree ...
    </mapDefinition>
  </situationTriggeredEvent>
      ... More for condition specification ...
</situationDefinition>
    ... More for metricDefinition ...
</MonitoringContextDefinition>
```

*Figure 3*

```xml
<informationModel>
  <primitiveType typeName="primitiveBase"/>
  <primitiveType typeName="number"><superType>primitiveBase</superType></primitiveType>
  <primitiveType typeName="integer"><superType>number</superType></primitiveType>
  <primitiveType typeName="string"><superType>primitiveBase</superType></primitiveType>

<structuredType typeName="snapShot">
    <element elementName="currentInventory" elementType="integer"/>
    <element elementName="currentThreshold" elementType="integer"/>
  </structuredType>

<descriptorType typeName="describeMonitoringContextDefinition">
    <element elementName="isAutogenerated" elementType="string"/>
    <element elementName="resourceBundleKey" elementType="integer"/>
    <describingInstancesOf>MonitoringContextDefinition</describingInstancesOf>
  </descriptorType>
</informationModel>
```

*Figure 5*

```
<observationModel name="InventoryLevel">
  <eventType typeName="InventoryAlert">
    <element elementName="itemID" elementType="string"/>
    <element elementName="currentState" elementType="snapShot"/>
  </eventType>
  <monitoringContextDefinition name="monitorInventoryLevel">
    <descriptor name="monitoringContextDefinition_monitorInventoryLevel"
            type="describeMonitoringContextDefinition">
      <slot name="isAutogenerated" value="false"/><slot name="resourceBundleKey" value="10"/>
    </descriptor>
    <situationDefinition name="inventoryTooLow">
      <situationTriggeredEvent name="lowInventory" type="InventoryAlert">
        <mapDefinition>
          <slot>itemID=monitorInventoryLevel.itemIdentifier</slot>
          <slot>currentState.currentInventory=monitorInventoryLevel.inventory</slot>
          <slot>currentState.currentThreshold=monitorInventoryLevel.threshold</slot>
        </mapDefinition>
      </situationTriggeredEvent>
    </situationDefinition>
  </monitoringContextDefinition>
</observationModel>
```

*Figure 6*

```
Expression :==BinaryLogicalExpression
BinaryLogicalExpression :==ConditionalOrExpression
ConditionalOrExpression :==ConditionalAndExpression ( <OR>
    ConditionalAndExpression )*
ConditionalAndExpression :==ComparisonExpression ( <ComparisonOp>
    ConditionalExpression )*
ConditionalExpression :==NumericalExpression ( <ComparisonOp>
    NumericalExpression )*
NumericalExpression :==AdditiveExpression
AdditiveExpression :==MultiplicativeExpression ( ( <ADD> | <MINUS> )
    MultiplicativeExpression )*
MultiplicativeExpression :==UnaryExpression ( ( <MULTIPLY> |
    <DIVIDE> | <MODULAR> ) UnaryExpression )*
UnaryExpression :==  <MINUS>  PrimaryExpression  | <NOT>
    PrimaryExpression
PrimaryExpression :==Literal | "("Expression")" |
    ModelPathExpression
ModelPathExpression :==PathPrefix ( Step )*
PathPrefix :==LOOKAHEAD(2) <ID> "("ArgumentList")" | <ID> " " <ID>
Step == "("Expression? ".." Expression? ")" | "." <ID>
ArgumentList :==Expression ("," Expression)*
Literal :== <INTEGER_LITERAL | <REAL_LITERAL> |
    <STRING_LITERAL> | <BOOLEAN_LITERAL>
```

*Figure 9*

SYSTEM AND METHOD FOR DEVELOPING AND ENABLING MODEL-DRIVEN XML TRANSFORMATION FRAMEWORK FOR E-BUSINESS

This application is a continuation application of U.S. Ser. No. 11/337,025, filed Jan. 23, 2006, now abandoned.

BACKGROUND OF THE INVENTION

1. Field of the Invention

The present invention generally relates to creating and editing business models and, more particularly, to a system and method using a pre-defined internal meta-model to classify business activities into several types of management components and govern all types of business operations. The invention provides a general model driven translation approach that can facilitate code re-use and yet enforce a built-in validation capability.

2. Background Description

As eXtensible Markup Language (XML) formats have been widely adopted for representing business documents both within and across enterprises, XML to XML translation becomes a common and critical component for business process integration. Script-based approaches usually include a fixed translator, and translation methods are coded inside style sheets or annotated schemas. Document Object Model (DOM) tree-based approaches provide fixed sets of tree traversal Application Program Interfaces (APIs) for developers to program the translators. However, there are limitations for these approaches.

The XML Stylesheet Language Transformation (XSLT) approach can not guarantee that the translated XML documents will conform to a complicated schema, thus requiring an extra validation stage. Other approaches may require designing a complicated code re-using utility to alleviate programming effort and for better coping with future schema upgrades. There is a great need for a general model driven translation approach that can facilitate code re-use and yet enforce a built-in validation capability.

SUMMARY OF THE INVENTION

Business Performance Management (BPM) aims at monitoring system activities, identifying bottlenecks for business operations, spotting anomalies after correlating a sequence of events, sending out alerts when exceptional situations are detected, and displaying statistics and aggregated information onto a dashboard. A model-based BPM approach is adopted, and monitored entities (e.g., input events, metrics, outbound events, situation detections, and alert actions, etc.) are described in an observation model that conforms to a pre-defined meta-model. The observation models are created by modeling tools, serialized in the standard XML Metadata Interchange (XMI) format, and consumed by an observation manager during the runtime. Because of the serialized nature, it can be a daunting task to create or modify a model in XMI directly.

The invention thus defines a simplified XML schema, so that observation models based on the new human readable format can be easily composed using XML editing tools or even text editors. Since observation manager runtime can only accept XMI models, there is still needed an XML to XMI translation utility. Due to the limitations of other approaches, the invention provides a model driven development framework for building such a utility. This approach implements a strong built-in validation capability in that validation logic is embedded into the code. Once the model is instantiated and populated, it is guaranteed to be a valid in-memory model that conforms to the meta-model.

Since XMI itself is an XML document, XML to XMI translation can be viewed as a variant of XML to XML translation. However, XML to XMI translation is more rigid due to the fact that the schemas for serialized models in XMI are loosely defined (with a data type ANY in the XMI schema to allow any conceptual models in arbitrary structures). For example, models in XMI format have flattened structures that may include parsed mathematical formulas and logical expressions. Extra model conformance and validation checks are needed to ensure a valid model.

According to the invention, a pre-defined internal meta-model is used to classify business activities into several types of management components and govern all types of business operations. For example, an information model defines numerous artifacts and system resources, and an observation model specifies monitoring context definitions, metric types, and inbound/outbound event definitions. In other words, an observation meta-model defines a formal specification for users to describe monitoring context related information. The system according to the invention provides for model transformation in a way that handles the following features:
customized structure flattening;
complex structure types;
structure recovery from expressions; and
nested and recursive model definitions.

BRIEF DESCRIPTION OF THE DRAWINGS

The foregoing and other objects, aspects and advantages will be better understood from the following detailed description of a preferred embodiment of the invention with reference to the drawings, in which:

FIG. 2 is a sample XMI listing for the information model;

FIG. 3 is a sample XMI listing for the observation model;

FIG. 5 is a sample XML listing for the information model;

FIG. 6 is a sample XML listing for the observation model;

FIG. 9 is a sample of the input expression grammar; and

DETAILED DESCRIPTION OF A PREFERRED EMBODIMENT OF THE INVENTION

Commercial modelers usually provide Graphic User Interface (GUI) tools for users to create new or edit existing models. The resulting models are exported in a standard serialized format, such as XMI. Observation model editors and observation managers can read the serialized XMI observation Models that may be created from numerous modeling tools like RATIONAL ROSE (RATIONAL ROSE is a modeling too and a trademark proprietary to IBM Corporation) RATIONAL ROSE is a visual modeling and development tool using Unified Modeling Language (UML).

Figure 1:
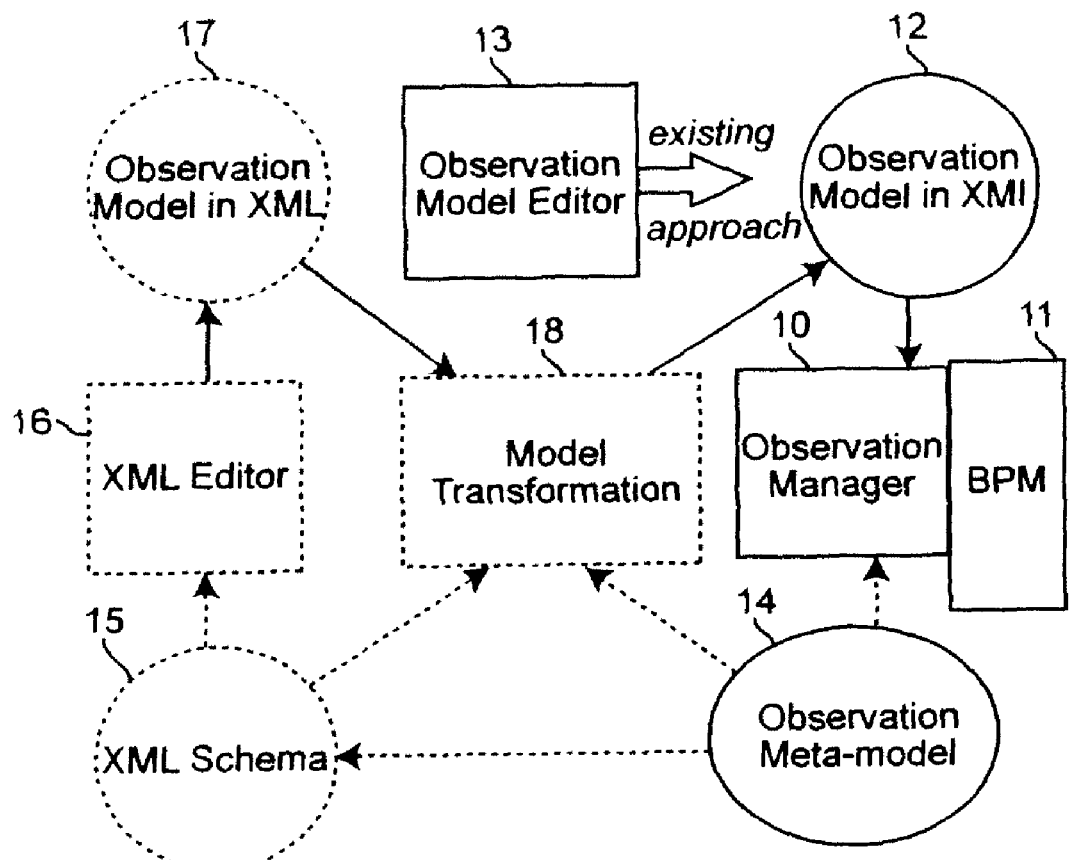
FIG. 1 is is a data flow diagram showing existing and new approaches for a model-based observation manager.

FIG. 1 shows existing and new approaches. In the existing approach, the model-based observation manager 10 is a critical component of a BPM system 11. The observation model 12 is created in XMI by an editor 13, e.g., RATIONAL ROSE, and is consumed by the observation manager 10. FIG. 1 also illustrates the new approach according to the present invention, where dotted boxes and ovals represent the new processes and artifacts respectively. The approach taken by the present invention eliminates the dependency to any observation model editor 13 by providing a shortcut to create models in XMI. This shortcut is based on a simplified XML representation and an incremental model transformation framework.

More particularly, a pre-defined observation meta-model 14 provides input to XML schema 15 which, in turn, provides input to XML editor 16. The XML editor 16 generates the observation model 17 in XML. Model transformation 18 receives the observation model 17 in XML and, with inputs from the XML 15 schema and the observation meta-model 14, generates the observation model 12 in XMI. This approach, described in more detail below, guarantees that the in-memory model conforms to the meta-model and is valid.

XMI Model

In a typical XMI model, every element or object has a unique ID definition, which can be a long 32 hexadecimal digit as in the observation model, or an XPath expression. In either case, when a parent element has many child elements, its child link (as an attribute) may include a long and verbose string that concatenates all of the IDs associated with its child elements. It can be a daunting task for a person to re-construct nested structures and element relations from a serialized model in XMI.

FIG. 2 shows a fragment of a sample XMI information model of our observation manager. For clarity, the long hexadecimal digits have been replaced with simple strings. Although the information model in this example is conceptually a parent of six child data type definitions, they appear on the same level in XMI. In other words, the parent-child structure has been flattened. The relation is now described in a pair of attributes, ownedMember and owningPackage. The ownedMember of the parent information model is a concatenation of six IDs, and the owningPackage attributes of the six child elements include the parent ID. Note that not all of the structural relations are flattened. For example, attribute ownedAttribute is still nested inside structuredDataType or DescriptorType.

FIG. 3 shows a fragment of an observation model that includes an event type definition and a monitoring context definition. The event type definition for InventoryAlert is defined with two attributes, itemID and currentState, where itemID is of type IM-4 referring to a string type and currentState is of type IM-5 referring to a structural data types snapshot: The monitoring context definition includes a descriptor, a situation definition and many metric definitions (not shown). The descriptor is for describing this monitoring context, similar to an annotation, and refers to a descriptor type (IM-6) defined in the information model. The situation definition includes triggering event and condition evaluation (not shown). The triggering event is of type OM-I, referring to InventoryAlert, and a map definition. The content of the map definition is not shown, since it is very verbose and represents complex parsed trees for assignment and condition statements that involve the L-value (left of "=" for assigning value into) and R-value (right of "=" for reference) evaluations of structural data types, such as OM-1 and IM-5.

XML Representation and Schema

An XML schema is defined based on the meta-model for the observation model, as described in the previous subsection. According to the classifications in the XMI model, we similarly defined two schema files (info.xsd and monitor.xsd) to better group related element definitions.

Figure 4:
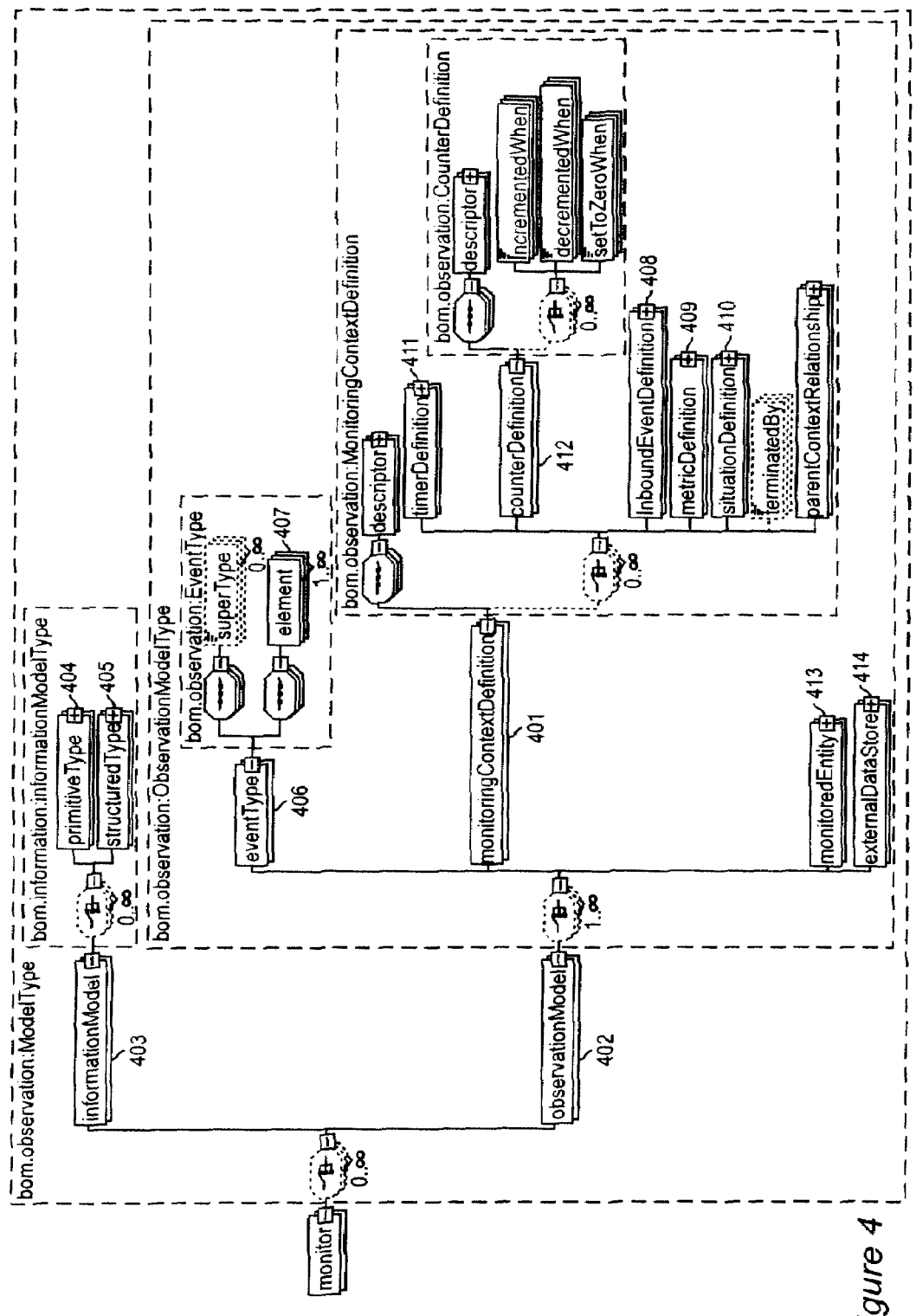
FIG. 4 is a block diagram showing a sample input schema.

FIG. 4 shows a sample snapshot of the schema for our XML representation. The schema makes a monitoring context definition 401 a child element of an observation model 402. The information model 403 includes 0 or more primitive types 404 and structural type definitions 405. Event structures and elements 407 are declared through event type definitions 406, which are used to define inbound event definitions 408. These defined inbound events can then be used or referred by metric definitions 409 and situation definitions 410. Additional types of entities that can be defined via the schema include timer definitions 411, counter definitions 412, static monitoring contexts (monitored entities 413), and external data stores 414, etc.

The XML schema includes the following features: (a) referencing elements by meaningful names; (b) replacing bi-directional links with unidirectional links; (c) using strings to represent mathematical formulas and logical expressions; and (d) recovering flattened structures with nested XML constructs. However, it is complicated to implement these features all at once. Thus, a simple XML schema is defined for catching the basic constructs of the XMI model first, and then gradually added more features.

FIGS. 5 and 6 show fragments of an input model which is equivalent to the model shown in FIGS. 2 and 3.

XML to XMI Translation Framework

In this Section, the translation framework to transform models in XML representation to equivalent models in XMI is described. Two alternatives are considered: (1) using XML Style-sheet Language Translation (XSLT), and (2) creating a translator to traverse the input DOM and to generate the output DOM that corresponds to XMI. Both approaches have some limitations in terms of fast development. The standard XML schema for XMI includes ANY data type to allow any meta-data whose format is well-formed. ANY means that recursion and non-determinism are possible formats. The approaches may have problems creating a complicated model. Also, an extra validation stage may be required to check for model conformance. Moreover it is difficult for these approaches to generate the specific IDs required for observation manager to reference objects. Furthermore, it can be quite tedious for these approaches to set up bi-directional links for all of the parent-child relations.

Due to these issues relating to development cost, a model transformation framework was developed in a model driven manner. The approach was to locate and re-use utilities provided by XMI as much as possible. For example, an in-memory instance of the target XMI model based on an input XML instance can be instantiated, and then the serialization utility can be applied to the instance for automatically generating the serialized XMI model. To create an in-memory XMI model, individual output objects may be instantiated separately and create uni- or bi-directional links to connect the objects, thus forming a complete model. Moreover, there may also be an in-memory instance of the input XML. A method is provided for mapping input objects to output objects, and relations in the input instance to relations in the output instances.

The transformation framework should support incremental development, in that new features are added and implemented through the same framework. The users may design a first set of XML schemas that are closely related to the output XMI model. After the primitive set of input schemas has been tested, new features are gradually added.

The build-time process involves the iterative development process, so that new features require a change in the input schema, and may require changes in the generated code. The framework needs to preserve the code changes made due to the previous developed features.

The run-time process involves allowing users to model the BPM activities through the new input schema. The framework will accept the new model and convert it into an in-memory instance of the output model, which will be serialized into the XMI format.

The Eclipse Modeling Framework (EMF) is an excellent choice for creating such transformation framework. Besides generating model editor code, EMF provides automatically generated model code for instantiating model objects and handling model instances. The most common set of code includes getter and setter methods for manipulating child objects. It provides a useful mechanism to specify which parts of code should not be re-generated during the incremental development process, preserving the changes previously made for adding new features. EMF can take as input a Rose model file (with a file extension.md1) an Ecore file, and an XML schema file (with a file extension.xsd).

Figure 7:
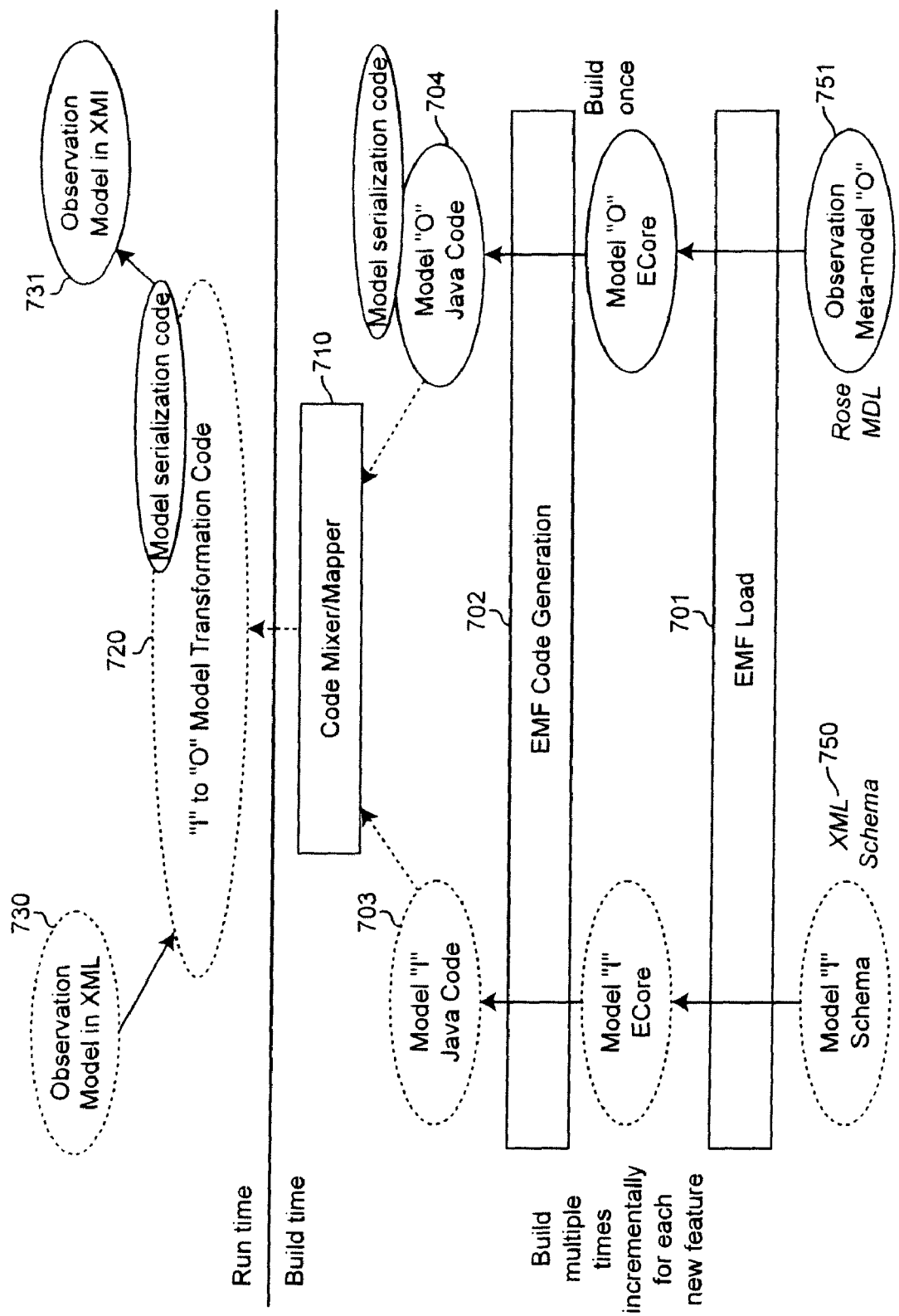
FIG. 7 is a block diagram illustrating the implementation framework.

FIG. 7 shows the implementation framework using EMF loading 701 and code generation 702 utilities. Based on the two model schemas 750, 751, two sets of JAVA (JAVA is a programming language and trademark proprietary to SUN Microsystems) code 703, 704 are automatically generated. The source (or input) model is Model "I" 750 and the target (or output) model is Model "O" 751. The EMF generated code exposes reusable simple methods, for creating bidirectional links, checking uniqueness, verifying containment relations etc. There is a need for a code mixer or mapper 710 that can create the model transformation code 720, which transforms an input XML model instance 730 to an output XMI model instance 731 during the run-time. The implementation framework allows customized code as the code mixer or mapper 710. As shown in the figure, we re-use the model serialization utility for the output model to create XMI.

Model-Driven Implementation

The implementation according to the preferred embodiment of the invention is now described in more detail. Since there are two sets of Java code generated, one for the input model and the other for the output model, there is need to design an effective way to mix both sets of code. In the current implementation, the mapper utility was manually coded for each input object type based on the knowledge of both models. The mapper utilities can perform two functions: to instantiate corresponding output objects and to create links among output objects for preserving relations. The EMF generated JAVA code also follows some design patterns making it very easy to create the mapper utilities. There are utility classes which contain big switch statements. The switch statement examines a given object, and based on its object class, invokes methods defined for the object.

Figure 8:
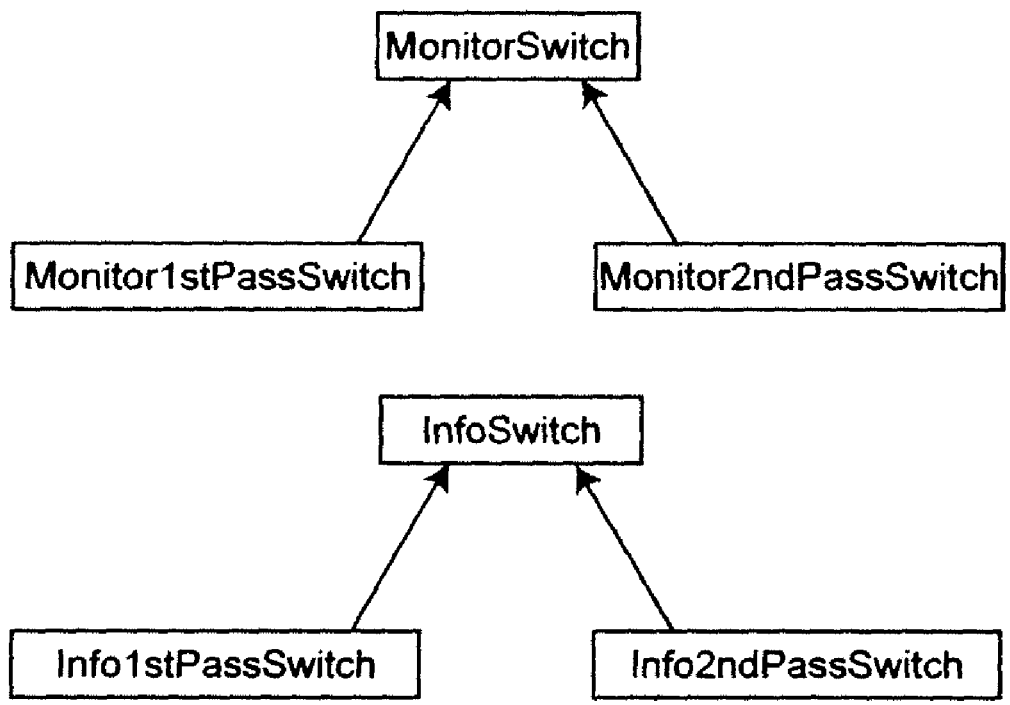
FIG. 8 is a block diagram showing the switch utilities extension.

FIG. 8 shows an example of class diagrams that include two base classes, MonitorSwitch and InfoSwitch, corresponding to the two schema files (monitor.xsd and info.xsd) created. Each class includes a switch statement with cases corresponding to containing classes or objects defined by both schemas.

The model transformation is a multiple-pass process, where originally we implemented two passes of sequential traversals of the input objects. As new features are added, additional passes may be added. By performing at least two passes, we simplify the coding process as the order of processing individual input objects is not critical. Most of EMF generated JAVA classes and utilities can be readily re-used.

During the first pass, for every object of the input model, its corresponding object(s) is created of the output model. These new objects are not connected at all until the second pass. Except for a few cases, there is a one-to-one correspondence between objects of the input and output models. One exceptional example is an object of a simplified expression (string) may map to multiple objects of the parsed expression. During the first pass, the mappings from paths to objects and from type names (string) to type definitions are recorded in symbol tables or hash tables, which will be used during the second pass to resolve referencing issues.

The second pass properly sets up links among the output objects. The links represent parent-child and owning-owned relationships, where in most cases they are bidirectional. An advantage for using EMF is that its Ecore model automatically sets up a bidirectional link with a single method call. The process is conceptually simple. When an input model node ($N_{IN}$) is processed, we first locate its corresponding output model node ($N_{OUT}$) that was created during the first pass. Then based on the input structure, child nodes of $N_{IN}$ are located. For each child node ($N_{IN\_child}$), its corresponding output model node(s) ($N_{OUT\_child}$) are located. These output model node(s) are then linked as child node(s) of $N_{OUT}$.

In the preferred implementation, each of the two base classes are extended to two sub-classes, as shown in FIG. 8, where the first sub-class includes a method callcreateOutputInstance( ) and the second sub-class includes a method call populateDataNLink2Model ( ) for each of the cases relating to an object class. The related object classes involved in the type checking cases of the switch statement must implement these new methods. For example, Monitor1stPassSwitch and Monitor2ndPassSwitch both extend the base class MonitorSwitch. For both sub-classes, we just override the related case methods (e.g., caseMetricDefinition ( )) to invoke either of the two new methods. To be more specific, the case methods in Monitor1stPassSwitch invoke the method createOutputInstance ( ), while the case methods in Monitor2ndPassSwitch invoke the method populateDataNLink2Model( ).

As the orders of node processing for both passes are not important, the coding process is greatly simplified. An in-memory instance will be created for the output model, which can be serialized into XMI file by EMF's simple API without much coding effort.

New features are added iteratively for the ease of testing and development. Several important features have been implemented including structure flattening, parsed structure recovery for expressions, nested observation models, complex event types, and descriptors.

Customized Structure Flattening

In the output model, some of the structures have been flattened so that parent nodes and child nodes are in the same level of an output model. However, the structure information is preserved with a pair of attributes (bi-directional link), one used in the parent node and the other used in the child node. The owningPackage attribute of a child node represents child-to-parent link and the ownedMember attribute of a parent node represents parent-to-child link. As a parent node may have multiple child nodes, the owned-Member attribute includes a concatenation of a sequence of IDs of the child nodes. It is the same for the owning Package attribute when there are multiple parent nodes.

As mentioned earlier, Ecore's add method can set up the bidirectional link in just one call. To implement this feature, we created a schema that preserves the structural information, as shown in FIGS. 4, 5 and 6. Just those child nodes need to be added to the same level as parent nodes for the output model.

Complex Event and Metric Types

Only primitive types were implemented at first, and then complex event and metric types followed. Structural types can be defined in the information model, e.g., snapShot in FIG. 5. Event types and metric types can be defined based on the primitive type definitions and structural types defined in the information model. For example, as shown in FIG. 6, the InventoryAlert event type is defined with two attributes: iternID of string type (primitive) and currentState of snapShot type (structural). Besides type definitions, there are two issues related to complex event and metric types: the L-value and R-value evaluations. For example, the InventoryAlert type actually has three attributes, itemID, currentState.currentInventory, and currentState.currentThreshold, where the last two come from the snapShot structural type. As shown in FIG. 6, all three attributes appear on the lefthand side of the sign, which require L-value evaluations. On the other hand, there are two metrics (monitorInventoryLevel.inventory and monitorInventoryLevel.threshold) appear on the right-hand side of the sign, which require R-value evaluations. Note that we did not show the two metric definitions due to space limit. The evaluations of both L-value and R-value that include fully qualified name delimited with "." signs are the subjects of the next new features in the next sub-section.

Parsed Structure Recovery for Expressions

Expressions can be easily written as a string representing a mathematical formula or logical expression. Most compilers can parse the expression string into a parsed tree. However, for simple expressions, it is sometimes easier to visualize the string in the original un-parsed format than having to browse through the parsed tree. Therefore, the schema just uses an "expression" tag to allow formulas in a string format. However, we provide a grammar for parsing the expression, as shown in FIG. 9.

For example, what follows is an XML fragment that shows a sample input expression string:

```
<expression>
    monitorInventoryLevel.initializeInventory.
        initialQuality*0.10
</expression>
``` and its transformed output expression instance, which is verbose.

```
<expression type="BinaryNumericExpression"
        uid="CO" operator="MULTIPLICATION">
    <firstOperand type="ModelPathExpression"
            uid="EA">
        <steps type="ReferenceStep" uid="DA"
        referencedObject="B5"/>
        <steps type="StaticStep" uid="6A"
        stepName="initialQuality"/>
    </firstOperand>
    <secondOperand
        type="RealLiteralExpression"
        uid="4B" realSymbol="0.10"/>
</expression>
```

The implementation is based on JAVACC, a popular parser and scanner generator for use with JAVA applications. We compose the grammar specification to embed JAVA glue code that imports and refers source APIs from the output model. The output of JAVACC is a JAVA program that contains this glue code. During the run-time, the program can instantiate and populate a small expression tree for the output model when there is a match to the grammar. The expression tree may include multiple nodes that involve evaluation of L-values and R-Values.

To evaluate the R-value for x1.x2.x3, the reference object (x1) and its type Tx1 are first obtained. Then the second step (x2) and its type Tx2 are obtained. Finally we evaluate step x3 and its type Tx3. To evaluate the L-value for x1.x2.x3, the defining attributes of the intermediate referencing objects need to be located.

Nested Observation Models

Figure 10:
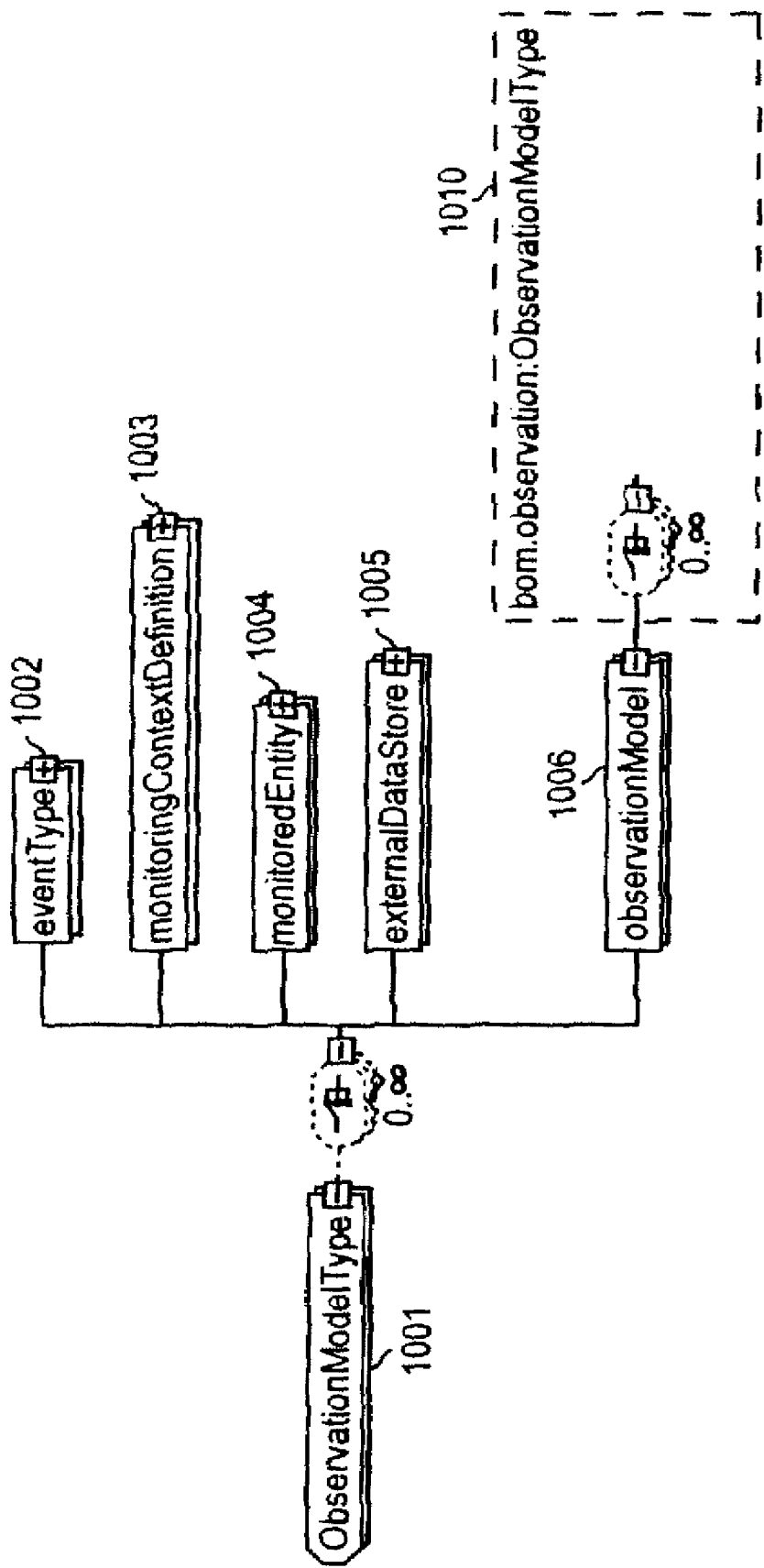
FIG. 10 is a block diagram of the nested input observation model.

The schema is changed to include nested observation models, as shown in FIG. 10, introducing a recursive construct to the schema. The observation model type 1001 includes five children elements, i.e., eventType 1002, monitoringContextDefinition 1003, monitoredEntity 1004, extendedDataStore 1005, and observationModel 1006. The child element observationModel 1006 has a type "ObservationModelType" 1010 that is exactly the type of parent construct 1001. Therefore, we allow recursive constructs for observation models, i.e., nested observation models. For example, what follows is an XML fragment that shows two nested observation models:

```
<observationModel name="innerX">
    <observationModel name="innerY">
        <eventType typeName="InventoryYEvent">
            <element elementName="itemYID"
                elementType="string"/>
            <element elementName="initialYQuantity"
                elementType="integer"I>
        </eventType>
    </observationModel>
    <eventType typeName="InventoryXEvent">
        <element elementName="itemXID"
            elementType="string"/>
        <element elementName="initialXQuantity"
            elementType="integer"/>
    </eventType>
</observationModel>
```

To incorporate this new feature, it is necessary to make sure that the scopes of event and metric types are correctly evaluated. To achieve the desired scoping rules, we implemented a symbol table for each observation model. To evaluate event and metric types, it is only necessary to locate the right symbol table from the nearest enclosing observation model if possible.

Descriptors

Similar to annotations, descriptors explain the usages of individual element definitions. Most of the entities can be associated with one or more descriptors as an annotation mechanism. For example, FIG. 5 shows a descriptor type definition describeMonitoringContextDefinition in the information model, and FIG. 6 shows a descriptor reference of the same type for the monitorInventoryLevel monitoring context definition in the observation model.

While the invention has been described in terms of a single preferred embodiment implemented as a system and a method, those skilled in the art will recognize that the invention can be embodied in computer readable media containing code that implements the system and method and, further, that the invention can be practiced with modification within the spirit and scope of the appended claims.

Having thus described our invention, what we claim as new and desire to secure by Letters Patent is as follows:

1. A computer readable memory having code stored therein for developing and enabling model-driven eXtensible Markup Language (XML) transformation to XML Metadata Interchange (XMI) format, the code implementing the steps of:

applying to input model multiple passes of transformation, comprising applying at least two passes of sequential traversals including:

i) applying a first pass during which, for every object of input, is created a corresponding new object(s) of an output model, with the new objects not connected until a second pass, ii) applying the second pass and setting up links among the new objects which are output objects, with links representing parent-child and owning-owned relationships, the multiple passes resulting in Eclipse Modeling Framework (EMF)
   generated Java classes and utilities;

providing input to an eXtensible Markup Language (XML) schema which, in turn, provides input to an XML editor which generates an observation model in XML;

receiving the observation model by a model transformation component which generates an observation model in XML Metadata Interchange (XMI);

whereby an in-memory model is produced that conforms to the meta-model and is valid according to built-in validation capability through code-embedded validation logic.

2. A system that uses a pre-defined internal meta-model to classify business activities into several types of management components and govern all types of business operations, the system comprising:

a memory;

a pre-defined observation meta-model that provides input to an eXtensible Markup Language (XML) schema;

an XML editor which receives input from the XML schema, the XML editor generating observation model in XML; and a model transformation which receives the observation model in XML together with inputs from the XML schema and the observation meta-model and generates an observation model in XML Metadata Interchange (XMI), wherein an in-memory model conforms to the meta-model and is valid, said pre-defined observation meta-model, said XML editor, and said model transformation being configured to perform the steps of:

applying to the input model multiple passes of transformation, comprising applying at least two passes of sequential traversals including:

i) applying a first pass during which, for every object of the input, is created a corresponding new object(s) of an output model, with the new objects not connected until a second pass, ii) applying the second pass and setting up links among the new objects which are output objects, with links representing parent-child and owning-owned relationships, the multiple passes resulting in Eclipse Modeling Framework (EMF)
   generated Java classes and utilities;

providing input to an eXtensible Markup Language (XML) schema which, in turn, provides input to an XML editor which generates an observation model in XML;

receiving the observation model by a model transformation component which generates an observation model in XML Metadata Interchange (XMI);

whereby an in-memory model is produced that conforms to the meta-model and is valid according to built-in validation capability through code-embedded validation logic.

3. A model-driven XML to XMI transformation framework method for transforming an input model which is a pre-defined internal meta-model which is used to classify business activities into several types of management components and to govern business operations, comprising the steps of:

applying to the input model multiple passes of transformation, comprising applying at least two passes of sequential traversals including:

i) applying a first pass during which, for every object of the input, is created a corresponding new object(s) of an output model, with the new objects not connected until a second pass, ii) applying the second pass and setting up links among the new objects which are output objects, with links representing parent-child and owning-owned relationships, the multiple passes resulting in Eclipse Modeling Framework (EMF)
   generated Java classes and utilities;

providing input to an eXtensible Markup Language (XML) schema which, in turn, provides input to an XML editor which generates an observation model in XML;

receiving the observation model by a model transformation component which generates an observation model in XML Metadata Interchange (XMI);

whereby an in-memory model is produced that conforms to the meta-model and is valid according to built-in validation capability through code-embedded validation logic.

4. The method of claim 3, further comprising the step of embedding validation logic in code which guarantees a valid in-memory model that conforms to said pre-defined internal meta-model.

* * * * *